Aug. 7, 1956 G. D. PETERSON 2,757,522
COUPLING
Filed Aug. 16, 1952 2 Sheets-Sheet 1
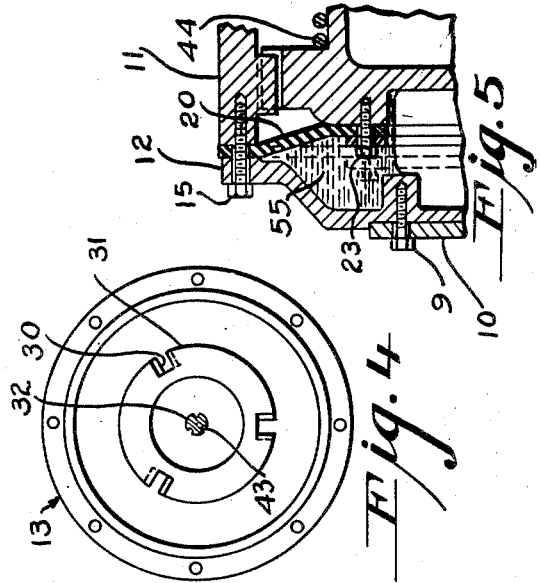
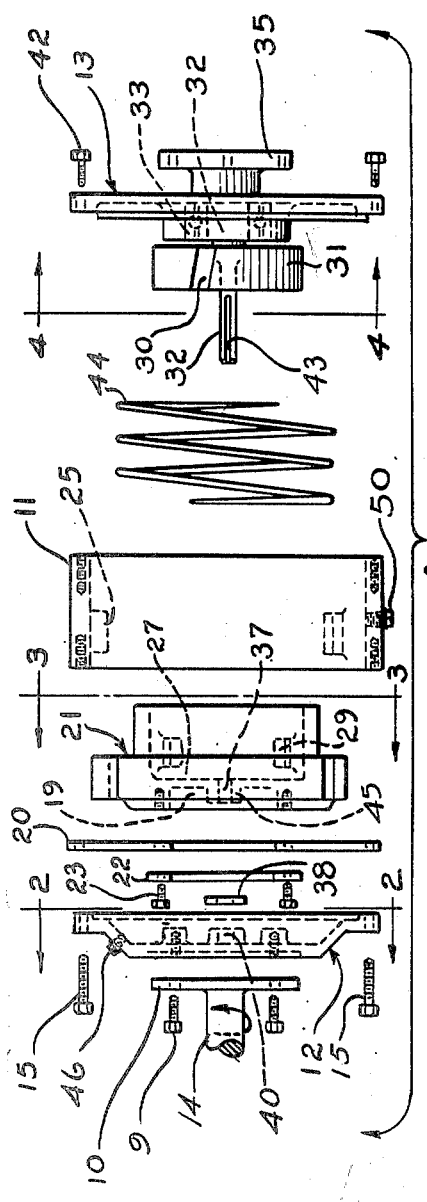
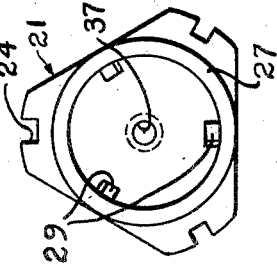
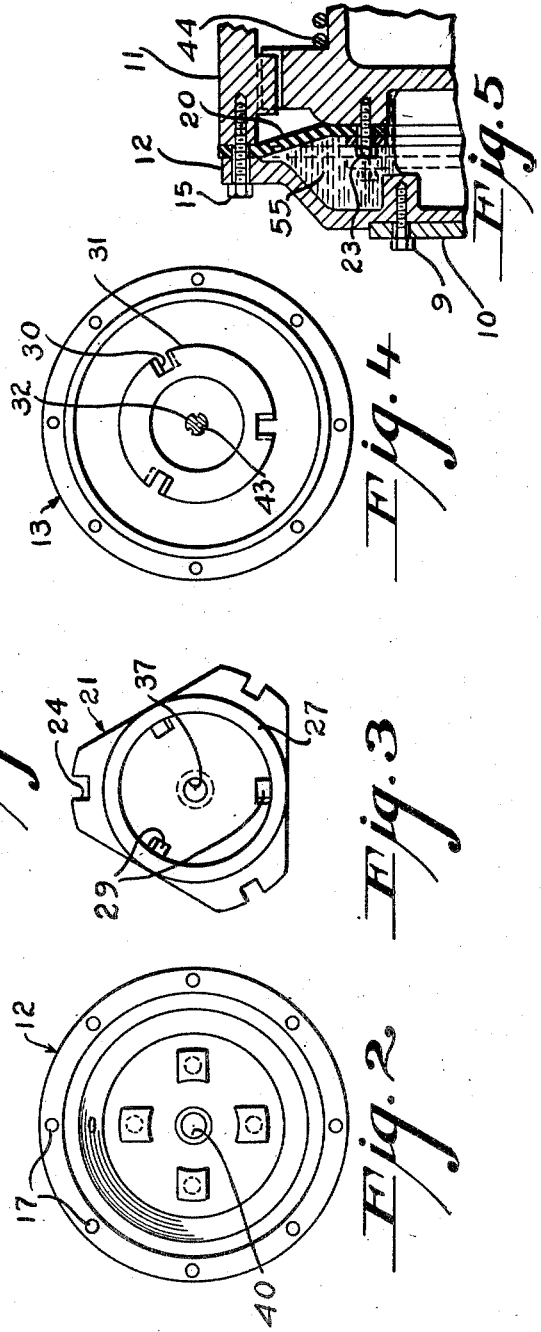
INVENTOR.
GERALD D. PETERSON
BY Vance E. Hoffman
ATTORNEY.

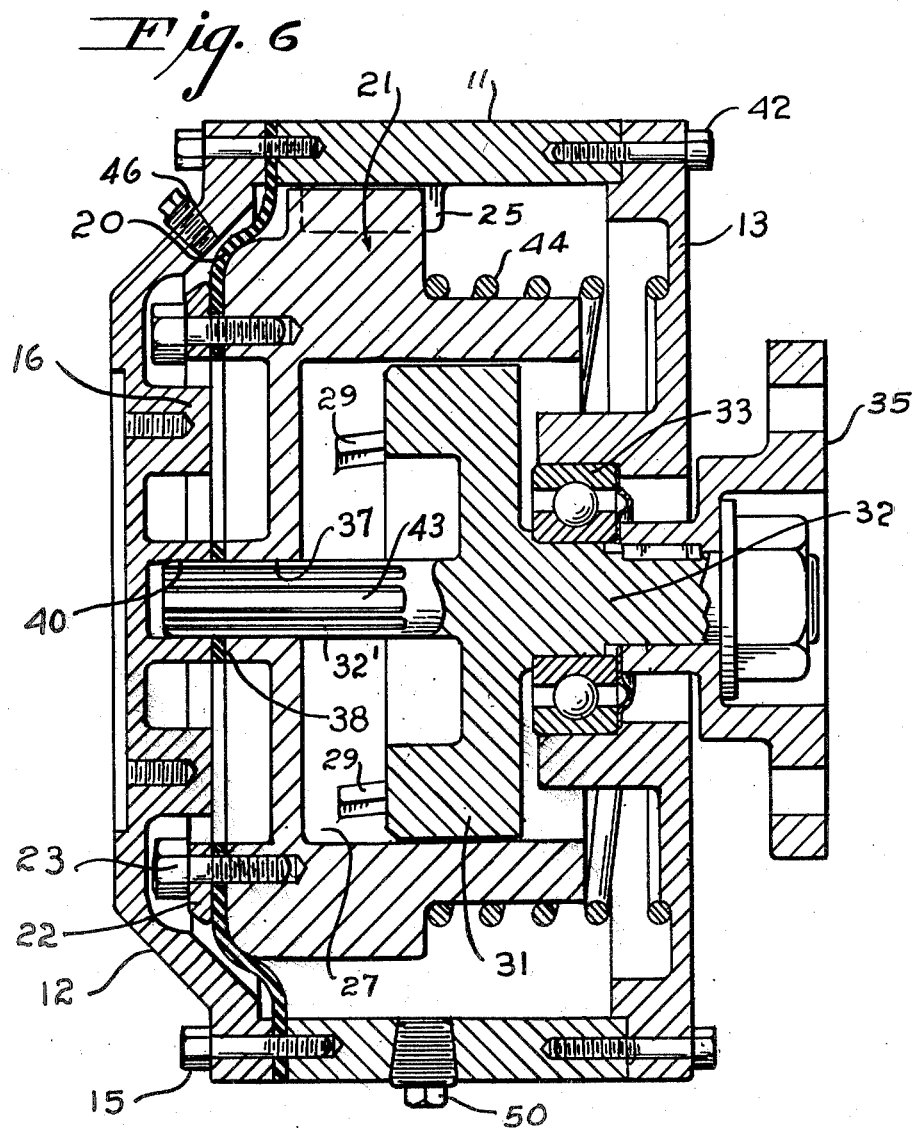

2,757,522
COUPLING

Gerald D. Peterson, Corning, N. Y.

Application August 16, 1952, Serial No. 304,822

1 Claim. (Cl. 64—25)

The present invention relates to coupling devices for automatically changing the angular position of a driven shaft relative to a drive shaft whenever their speed of rotation varies beyond a predetermined tolerance range.

Devices of the foregoing character are of particular utility for example as a means of varying with speed the time of injection of fuel to the cylinders of a diesel engine or the ignition timing of other types of internal combustion engines although not necessarily limited to such uses.

The prime object of the invention is a device of the foregoing character which is of relatively simple construction and which will be reliable in operation.

A further object of the invention is a centrifugally operable device whose output end turns through a predetermined angle relative to the turning movement imparted to its input end under control of the speed of rotation of the device per se.

In accordance with the invention a compact coupling of the foregoing character comprises a cylindrical housing having one end closure thereof adapted, for example, for connection to a rotary drive shaft and having projected from its other end closure a shaft for connection with a shaft to be driven in unison with the drive shaft over a given range of speeds, and provided with facilities within the housing for effecting a limited angular movement between such housing and its shaft in a desired direction whenever such speed of rotation of the coupling deviates from such range.

In the accompanying drawing Fig. 1 is an exploded side elevation of a preferred form of coupling embodying the invention.

Fig. 2 is an end elevation of one end of such coupling as viewed in the direction indicated by arrows 2—2 in Fig. 1.

Fig. 3 is an end elevation of an inner part of the coupling as viewed in the direction indicated by arrows 3—3 in Fig. 1.

Fig. 4 is an end elevation of the end of the coupling opposite to that shown in Fig. 2 and as viewed in the direction indicated by arrows 4—4.

Fig. 5 is a fragmentary sectional view of the coupling with the parts in their centrifugally operated position.

Fig. 6 is a sectional view of the coupling.

Referring to the drawing in detail the assembly is embodied within a housing comprising a cylindrical shell 11 having end closing cover members generally designated 12 and 13 respectively. End closure member 12 is in the general form of a shallow plate with its cavity facing the shell end and to which it is secured by means of a plurality of cap screws such as 15. Member 12 also has lugs such as 16 tapped for receipt of cap screws such as 9 for clamping the flange 10 of a shaft 14 thereto. Clamped between member 12 and shell 11 is the peripheral portion of an annular diaphragm 20 which, at its inner edge, is clamped to an actuator 21 surrounding the border of a cavity 19 therein by means of a clamping ring 22 and screws such as 23.

The actuator 21 is provided with slots such as 24 running parallel to the axis of shell 11 which is provided with guide keys such as 25 adapted to occupy the actuator slots. Within a cylindrical cavity 27 in actuator 21 are guide keys such as 29 adapted to register with spirally cut slots or ways such as 30 in the peripheral border of a hub 31 fixed to an intermediate portion of a shaft 32 to be rotated in unison with the housing, such hub being adapted to occupy the actuator cavity 27. In other words the actuator 21 and hub 31 are spirally splined to one another. Shaft 32 passes through a suitable sealed bearing 33 centrally arranged in the end cover member 13 and on the projecting end preferably carries a flange 35 for connection with a piece of equipment to be driven thereby. The other end 32' of shaft 32 is of reduced diameter and has oil grooves such as 43 therein. Shaft portion 32' passes through the actuator cavity 27, a bore 37 therethrough connecting cavities 19 and 27, through cavity 19, and through a sealing washer 38 of gasket material and finally terminates in a cup 40 protruding from the inner surface of end closure member 12.

The end closing member 13 is fixed to the other end of shell 11 by means of screws such as 42 which are screw threaded into shell 11 and hold a spring 44 partly compressed between the actuator 21 and member 13 so as to normally hold the actuator in its leftward position as shown in Fig. 1 with the sealing washer 38 compressed between the end wall of cup 40 and the hub 45 bordering the bore 37 through the actuator 21. End cover 12 has a threaded aperture provided with a plug 46 removable to permit the introduction fluid into the cavity jointly afforded by such end cover and the oppositely disposed actuator cavity 19. In a similar fashion shell 11 has a threaded aperture through its wall provided with a plug 50 removable to permit the introduction of fluid into the area in that portion of the housing between diaphragm 20 and end closure member 13.

The area to the left of diaphragm 20 is provided with a charge of actuating material such for example as the mercury 55 (Fig. 5), although solid materials such as shot or the like may, if desired, be employed. The area to the right of the diaphragm preferably contains a small charge of lubricating oil (not shown) or the like.

Operation

When the device is rotated about its axis, irrespective of the end from which it is being driven or its direction of rotation, the entire housing, shaft 32 and the associated flange 35 rotate in unison until a predetermined speed of rotation has been attained. Thereafter as the speed of rotation increases the mercury becomes progressively more and more effective to exert lateral pressure on the actuator 21, so that through a selected speed range it moves from its initial to its extreme alternative position. As will be understood, during this range of speed change the angular position of the housing relative to flange 35 about their common axes changes in a direction and a number of degrees dependent on the pitch of the grooves or ways 30.

At the commencement of this movement the pressure of hub 45 against washer 38 effecting a seal between the area occupied by the mercury and that occupied by oil is broken thus preventing the creation of vacuum in the mercury cavity as it is being enlarged by the joint displacement of the diaphragm and of the actuator into the area in part occupied by oil and which otherwise would greatly reduce its effective force. It is desired to point out that the provision of the seal between the mercury and oil cavity areas comprises an important feature of the invention since the seal functions as a valve to prevent pressure being built up in the area to the right of the actuator and diaphragm as they are being forced into such area by mercury. Of course, the oil serves the function to keep all relative moving parts thoroughly lubricated, some oil being permitted to even enter the mercury containing area via grooves such as 56 in the shaft portion 32′.

The cavity 19 in the actuator 21 plus the cavity space afforded by end closure member 12 provides space for a supply of mercury sufficient to give an axial thrust to the actuator 21 necessary to reliably shift it from its normal position to its extreme alternative position as the coupling rotates through a predetermined speed range.

As will be understood the speed range at which the mercury is enabled through centrifugal action to laterally displace the actuator is determined by the volume of mercury provided for and the characteristics of the spring 44. It should be further noted that, whereas in Fig. 5 the diaphragm 20 is shown distorted rightward in its operated position it may, if desired to reduce the quantity of mercury required, be normally distorted leftward.

As will be further understood the pitch of the grooves or ways 24 in the hub 31 are such that irrespective of the amount of rotational torque applied to the coupling in any instance is insufficient to effect axial movement of the actuator 21 in the absence of axial pressure being applied to the actuator to suitably counter the action of spring 44.

I claim:

In a cylindrical housing, an axially movable element having an axial passage therethrough, an annular diaphragm connected at its inner border to said element and at its outer border to said housing and separating said housing into two compartments, a shaft passing through said element having a longitudinal groove therein providing a passage between such compartments, means for sealing said groove to one of said compartments including a resilient device continuously urging said element toward one end of said housing, and a liquid within said one end of said housing centrifugally distributed into the area thereof occupied by said diaphragm to force said element in a direction away from the end of the housing toward which the element is urged by said resilient device to expose said groove to such one compartment whenever the housing is rotated beyond a predetermined speed.

References Cited in the file of this patent

UNITED STATES PATENTS

| | | |
|---|---|---|
| 1,618,644 | Dickson | Feb. 22, 1927 |
| 2,107,070 | Fleury | Feb. 1, 1938 |
| 2,177,120 | Schaeren | Oct. 24, 1939 |
| 2,190,900 | Von Tavel | Feb. 20, 1940 |

FOREIGN PATENTS

| | | |
|---|---|---|
| 509,508 | Great Britain | 1939 |